July 22, 1924.
W. H. DEVER, JR
TOOL HOLDER FOR AUTOMOBILES
Filed June 4, 1923
1,502,180
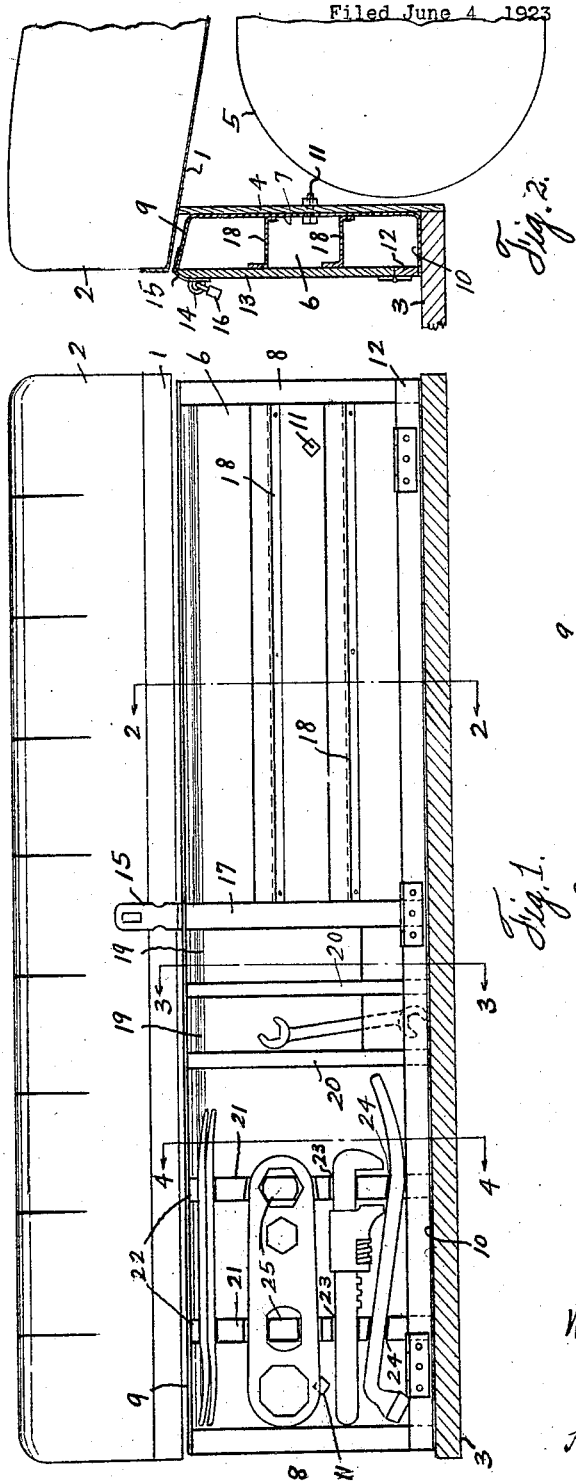
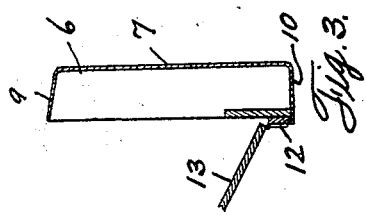
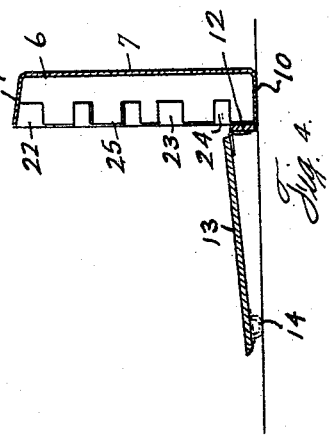
Inventor
Walter H. Dever Jr.
Hardway & Cathy
Attorneys Patented July 22, 1924.

1,502,180

UNITED STATES PATENT OFFICE.

WALTER H. DEVER, JR., OF HOUSTON, TEXAS.

TOOL HOLDER FOR AUTOMOBILES.

Application filed June 4, 1923. Serial No. 643,296.

*To all whom it may concern:*

Be it known that I, WALTER H. DEVER, Jr., a citizen of the United States, residing at Houston, in the county of Harris and State of Texas, have invented certain new and useful Improvements in a Tool Holder for Automobiles, of which the following is a specification.

This invention relates to new and useful improvements in a tool holder for automobiles.

One object of the invention is to provide a tool holder for Ford automobiles so formed and combined with the standard Ford automobile body as to utilize unoccupied space in front of the front seat and underneath the forwardly projecting front edge of the front seat cushion.

Another object of the invention is to provide a tool holder so combined with a Ford automobile body that it will utilize unoccupied space of the body as now constructed, and at the same time be out of the way, and readily accessible for use.

A still further object is to provide a tool holder of the character described specially formed to receive the various tools, forming the Ford tool kit in such a manner that they can be easily obtained when it is desired to use them and also in such a manner that they will not rattle when the vehicle is in motion.

While the type of holder has been specially designed for use on Ford automobiles, it may also be used on certain other types of automobiles now in use.

With the above and other objects in view the invention has particular relation to certain novel features of construction, arrangement of parts, and use, an example of which is given in this specification and illustrated in the accompanying drawings, wherein:—

Figure 1 shows a front view of the holder in open position.

Figure 2 shows the holder combined with the vehicle body, and shown in section, taken on the line 2—2 of Figure 1.

Figure 3 shows a vertical sectional view of the holder taken on the line 3—3 of Figure 1, and, Figure 4 shows a vertical sectional view taken on the line 4—4 of Figure 1.

In the drawings the numeral 1 designates the front seat support of a Ford automobile which has a cushion 2 thereon. The numeral 3 designates the foot board. A wall 4 extends from the rear edge of the foot board up to the seat 1, and supports the latter forming also an inclosure for the gasoline tank 5. The front seat 1 and cushion 2 extend forwardly and overhang the wall 4 leaving a space heretofore unoccupied. The numeral 6 designates generally the tool holder. This holder is preferably composed of sheet metal. It has the back 7, the ends 8, the top and bottom 9 and 10, and is of a contour to fit snugly underneath the projecting front edge of the front seat and is secured to the wall 4 by suitable bolts, 11, 11, or other suitable fasteners, so as to be removable. Across the bottom of the holder in front there is a retaining strip 12 to which the shutter 13 is hinged, said strip and shutter forming the front wall of the holder, which is substantially flush with the front of the cushion 2. The upper edge of the shutter has a staple 14 over which the hasp 15 engages, said hasp being hinged to the top of holder and a suitable lock as 16 may be employed to lock the shutter in closed position in the usual way.

The holder has a vertical partition 17, located approximately midway between its ends and on one side of this partition there are the shelves 18, 18, with their forward edges upturned to form retainers for small tools and the like carried on said shelves. The door when closed, fits closely against the upturned outer edges of the shelves, and they form braces for the door to prevent it from rattling. On the other side of said partition there are the compartments 19, 19, formed with suitable partitions as 20, 20, said compartments being provided to receive wrenches and the like. Beyond these compartments there are the vertical bars 21, 21 which are fastened in the holder and spaced apart. These bars have aligned notches as 22, 22, 23, 23, and 24, 24, for such tools as ordinary wrenches and the like, and the aligned projections 25, 25, to receive the hub cap wrench, all of which is shown in Figure 1. The bars 21 are of width equal to the depth of the holder so that when the door 13 is closed it will fit closely against said bars and hold the tools, carried by them, in proper position.

What I claim is:

1. A tool holder formed with a back, a top, and bottom and end walls, a retaining strip across the front of the holder at the bottom, front wall hinged to said strip at its lower edge, and forming a door, means for locking said door in closed position, shelves in said holder spaced apart, one above the other, and whose forward edges are upturned, said door resting against said upturned edges when it is in closed position.

2. A box-like holder whose front wall is hinged at its lower edge forming a door, means for locking the door in closed position, shelves spaced apart one above the other in said holder, and whose forward edges are upturned, said door fitting against said upturned edges when in closed position.

3. A box-like holder whose front wall is hinged at its lower edge forming a door, means for securing the door in closed position, vertical bars spaced apart in the holder whose forward edges have aligned tool retaining notches, said door fitting closely against said bars when in closed position to serve as a retainer to prevent the displacement of the tools from said notches, said bars also bracing said doors, and minimizing the vibration thereof.

In testimony whereof I have signed my name to this specification in the presence of two subscribing witnesses.

WALTER H. DEVER, Jr.

Witnesses:
W. H. DUNLAY,
WM. A. CATHEY.